(12) United States Patent
Saji

(10) Patent No.: US 9,751,137 B2
(45) Date of Patent: Sep. 5, 2017

(54) CUTTING EDGE ADJUSTMENT DEVICE, ROTARY MEMBER APPLIED TO THE DEVICE, AND TOOL BODY, CARTRIDGE, AND CUTTING INSERT HAVING STRUCTURES SUITABLE FOR THE DEVICE

(71) Applicant: TUNGALOY CORPORATION, Iwaki-shi, Fukushima (JP)

(72) Inventor: Ryuichi Saji, Iwaki (JP)

(73) Assignee: Tungaloy Corporation, Iwaki-shi, Fukushima (JP)

( * ) Notice: Subject to any disclaimer, the term of this patent is extended or adjusted under 35 U.S.C. 154(b) by 365 days.

(21) Appl. No.: 14/419,426

(22) PCT Filed: Aug. 6, 2013

(86) PCT No.: PCT/JP2013/071187
§ 371 (c)(1),
(2) Date: Feb. 3, 2015

(87) PCT Pub. No.: WO2014/024852
PCT Pub. Date: Feb. 13, 2014

(65) Prior Publication Data
US 2015/0217384 A1    Aug. 6, 2015

(30) Foreign Application Priority Data

Aug. 6, 2012  (JP) .................................. 2012-173585

(51) Int. Cl.
 *B23C 5/00*  (2006.01)
 *B23C 5/24*  (2006.01)
 *B23B 29/034*  (2006.01)

(52) U.S. Cl.
 CPC ........ *B23C 5/241* (2013.01); *B23B 29/03428* (2013.01); *B23C 5/2479* (2013.01);
(Continued)

(58) Field of Classification Search
 CPC ... B23C 5/2472; B23C 5/2479; B23C 5/2462; B23C 5/2489; B23C 5/2413;
(Continued)

(56) References Cited

U.S. PATENT DOCUMENTS 3,798,724 A * 3/1974 Czopor ................. B23C 5/2462
                                                                     407/31
3,887,975 A    6/1975 Sorice et al.
(Continued)

FOREIGN PATENT DOCUMENTS

CN     2399135      10/2000
DE     2754499      6/1979
(Continued)

OTHER PUBLICATIONS

International Preliminary Report on Patentability (IPRP) dated Feb. 10, 2015 issued in PCT counterpart application (No. PCT/JP2013/071187).

(Continued)

*Primary Examiner* — Will Fridie, Jr.
(74) *Attorney, Agent, or Firm* — Womble Carlyle

(57) ABSTRACT

A cutting edge adjustment device for a cutting tool for adjusting the position of a cutting edge of a cutting insert by causing movement of the cutting insert includes a rotary member for producing the movement. The rotary member is formed into a shape in which a substantially cylindrical portion having a constant radius and a cam portion having a cam face whose radius is gradually increased in a manner corresponding to the amount of the movement are arranged in a direction of a rotational center axis. The cam face is formed in such a manner as to have a section in which a radius is linearly increased, and consequently, the unit (Continued)

rotational angle of the rotary member on the rotational center axis is proportional to the unit movement amount of the cutting insert.

20 Claims, 10 Drawing Sheets

(52) U.S. Cl.
CPC ..... *B23B 2260/004* (2013.01); *B23B 2260/02* (2013.01); *B23C 2260/04* (2013.01); *B23C 2260/12* (2013.01); *Y10T 407/2224* (2015.01); *Y10T 407/2244* (2015.01); *Y10T 407/2254* (2015.01)

(58) Field of Classification Search
CPC . B23C 5/241; B23B 27/1692; B23B 27/1696; B23B 2205/04; B23B 2205/12; B23B 29/04; B23B 29/12; B23B 29/03428; B23B 2260/02
See application file for complete search history.

(56) References Cited

U.S. PATENT DOCUMENTS

| | | | |
|---|---|---|---|
| 4,938,638 A | 7/1990 | Hessman et al. | |
| 5,536,119 A * | 7/1996 | Werner | B23B 27/1622 407/113 |
| 6,030,153 A * | 2/2000 | Votsch | B23C 5/2444 407/36 |
| 6,056,484 A | 5/2000 | Mitchell et al. | |
| 6,325,574 B1 * | 12/2001 | Treige | B23C 5/08 407/35 |
| 6,406,225 B1 * | 6/2002 | Stojanovski | B23B 29/0341 408/153 |
| 6,971,823 B2 | 12/2005 | Satran et al. | |
| 7,390,150 B2 | 6/2008 | Kocherovsky et al. | |
| 9,216,458 B2 * | 12/2015 | Sashin | B23B 27/1696 |
| 2002/0110428 A1 * | 8/2002 | Noggle | B23C 5/2441 407/36 |
| 2003/0202848 A1 | 10/2003 | Gamble et al. | |
| 2004/0191008 A1 * | 9/2004 | Noggle | B23C 5/06 407/46 |
| 2004/0197155 A1 | 10/2004 | Robinson et al. | |
| 2008/0232910 A1 | 9/2008 | Hecht | |
| 2009/0238650 A1 | 9/2009 | Jansson | |
| 2009/0249607 A1 | 10/2009 | Kadosh | |
| 2010/0135735 A1 | 6/2010 | Satran et al. | |
| 2010/0178118 A1 * | 7/2010 | Hecht | B23C 5/2406 407/44 |
| 2011/0097165 A1 | 4/2011 | Choi et al. | |
| 2011/0211923 A1 * | 9/2011 | Yoffe | B23B 27/1662 407/110 |
| 2013/0028671 A1 * | 1/2013 | Hecht | B23B 27/1681 407/77 |
| 2013/0294853 A1 * | 11/2013 | Nedzlek | B23C 5/08 407/75 |
| 2014/0133925 A1 | 5/2014 | Athad | |
| 2014/0178136 A1 | 6/2014 | Mokthar | |
| 2015/0217384 A1 | 8/2015 | Saji | |
| 2015/0231705 A1 * | 8/2015 | Sashin | B23B 27/1696 407/89 |
| 2016/0089730 A1 * | 3/2016 | Kocherovsky | B23C 5/2472 407/88 |

FOREIGN PATENT DOCUMENTS

| | | |
|---|---|---|
| DE | 3042050 | 7/1982 |
| DE | 4407270 | 3/1995 |
| EP | 0033086 | 8/1981 |
| GB | 1334351 | 3/1972 |
| JP | S57-038702 U | 3/1982 |
| JP | 58066611 | 4/1983 |

OTHER PUBLICATIONS

International Search report dated Oct. 15, 2013 issued in PCT counterpart application (PCT/JP2013/071187).

* cited by examiner

CUTTING EDGE ADJUSTMENT DEVICE, ROTARY MEMBER APPLIED TO THE DEVICE, AND TOOL BODY, CARTRIDGE, AND CUTTING INSERT HAVING STRUCTURES SUITABLE FOR THE DEVICE

RELATED APPLICATIONS

This is a 371 US National Phase of International Patent Application No. PCT/JP2013/071817 filed Aug. 5, 2013, and published as WO2014/024852A1 on Feb. 13, 2014, which claims priority to JP 2012-173585, filed Aug. 6, 2012. The contents of the aforementioned applications are incorporated by reference in their entirety.

TECHNICAL FIELD

The present invention relates to a cutting edge adjustment device, a rotary member applied to the device, and a tool body, a cartridge, and a cutting insert having structures suitable for the device. More particularly, the present invention relates to a cutting edge adjustment device capable of adjusting the position of a cutting edge of a cutting insert mounted on an indexable cutting tool and the structures of a rotary member, a tool body, a cartridge, and a cutting insert that are relevant to the cutting edge adjustment device.

BACKGROUND ART

There are numerous cutting edge adjustment devices for finely adjusting the position of a cutting edge of a cutting insert in the field of an indexable cutting tool in the related art. Cutting edge adjustment devices are mainly used for regularly aligning the positions of cutting edges of a plurality of cutting inserts in a milling tool, respectively. Other than that, a cutting edge adjustment device is used when the projection amount of a cutting edge from a tool body is desirably adjusted also in a turning tool or a drilling tool.

Patent Literature 1 exemplarily discloses several embodiments of a cutting edge adjustment device by the use of a cam. This cutting edge adjustment device basically includes two cam faces abutting against a cutting insert to be mounted on a tool body (i.e., a milling cutter body) and a wedge for fixing the cutting insert to the tool body. The rotation of the cam causes the cutting insert to be directly pressed, thus adjusting the position of a cutting edge of the cutting insert.

CITATION LIST

Patent Literature

PTL 1: Japanese Patent Laid-Open No. H01-295709 (1989)

SUMMARY OF INVENTION

Technical Problem

However, the typical cutting edge adjustment device using the cam as disclosed in Patent Literature 1 does not take the relationship between the rotational amount of the cam and the movement amount of the cutting edge into consideration. As a consequence, it is difficult for an operator to move the cutting edge by a required distance in association with a cam rotating operation in the typical cutting edge adjustment device, thereby raising problems of the difficulty in accurately adjusting the position of the cutting edge, and further, much time required for adjusting the position.

The present invention has been accomplished in view of the above-described problems. Therefore, an object of the present invention is to use a rotary member such as a cam so as to facilitate the quick adjustment of the position of a cutting edge with high accuracy.

Solution to Problem

In a first aspect of the present invention, there is provided a cutting edge adjustment device (1) for a cutting tool for adjusting the position of a cutting edge of a cutting insert (4) by causing movement of the cutting insert (4), the cutting edge adjustment device (1) comprising:

at least one rotary member (5) for producing the movement;

wherein the rotary member (5) is formed into a shape in which at least one substantially cylindrical portion (17, 18) having an outer peripheral surface whose radius is constant and at least one cam portion (19) having a cam face whose radius is gradually increased in a manner corresponding to the amount of the movement are arranged in a direction of a rotational center axis (O), and wherein the cutting insert (4) is directly or indirectly pressed against the rotary member (5) by the action of the cam face according to the rotation of the rotary member (5) on the rotational center axis (O), so as to adjust the position of the cutting edge.

In a second aspect of the present invention, there is provided a rotary member (5) applied to the above cutting edge adjustment device (1), the rotary member (5) comprising the substantially cylindrical portions (17, 18) and the cam portion (19).

In a third aspect of the present invention, there is provided a tool body (2) having the cutting insert (4) fixed thereto directly or indirectly and including a structure for mounting thereon the above cutting edge adjustment device (1).

In a fourth aspect of the present invention, there is provided a cartridge (3) applied to the above cutting edge adjustment device (1), the cutting insert (4) being connected to the cartridge (3).

In a fifth aspect of the present invention, there is provided a cutting insert (4') comprising a concave curve that abuts against a rotary member (5) such that it is pressed directly against the rotary member (5) to be applied to the above cutting edge adjustment device (1).

Advantageous Effects of Invention

According to the present invention, it is possible to grasp the corresponding relationship between the rotational amount of the rotary member and the movement amount of the cutting edge when the position of the cutting edge is adjusted, thus readily and rapidly adjusting the position of the cutting edge with high accuracy.

DESCRIPTION OF EMBODIMENTS

Embodiments of a cutting edge adjustment device according to the present invention will be described with reference to the attached drawings.

Figure 1:
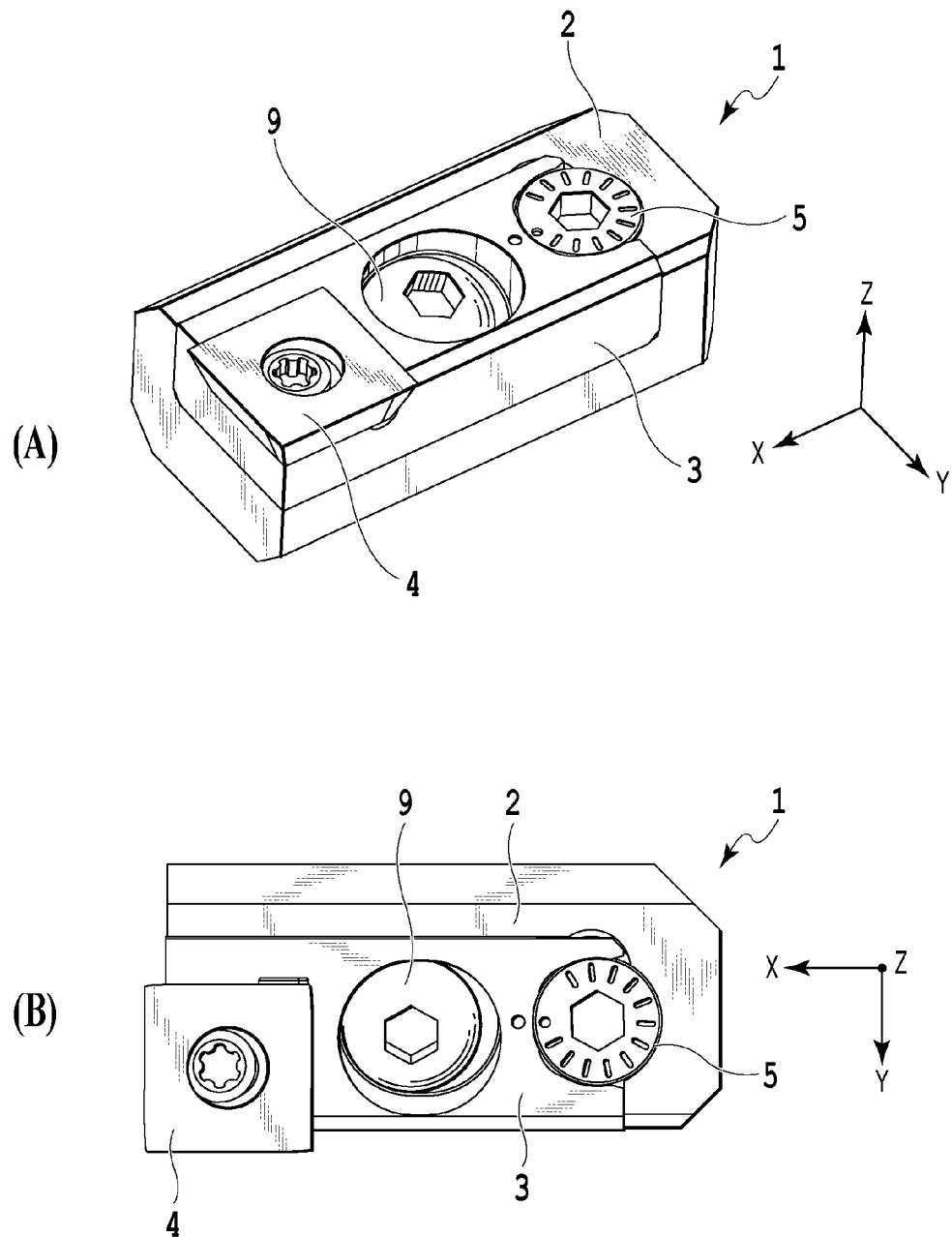
FIG. 1 shows an embodiment of a cutting edge adjustment device according to the present invention, wherein (A) is a perspective view and (B) is a top view.

As shown in (A) and (B) of FIG. 1, a cutting edge adjustment device 1 in the present embodiment basically has the configuration in which a cartridge 3 having a cutting insert 4 detachably attached thereto and a rotary member 5 having a cam face are arranged adjacently to each other in a tool body 2. Only a section of the tool body 2 having the cutting edge adjustment device 1 mounted thereon is shown in FIG. 1. The cutting edge adjustment device 1 in the present embodiment is applicable to various cutting tools inclusive of a turning tool, a milling tool, and a drilling tool. In other words, the cutting edge adjustment device 1 including the tool body 2 in the present embodiment is generally formed into a substantially rectangular parallelepiped. It is to be understood that the tool body 2 or the cutting edge adjustment device 1 should be formed into any appropriate forms and shapes according to a cutting tool, to which the cutting edge adjustment device 1 is applied.

In the cutting edge adjustment device 1 generally formed into a substantially rectangular parallelepiped in the present embodiment, an end at which the cutting insert 4 is mounted is referred to as a distal end whereas an end opposite to the distal end is referred to as a proximal end. In the following description, an axis parallel to a direction from the proximal end to the distal end is defined as an X axis, and further, two axes perpendicular to the X axis are defined as a Y axis and a Z axis. Moreover, the cutting edge adjustment device 1 in the present embodiment is assumed to have a largest dimension in the X-axial direction. The cartridge 3 is moved in the X-axial direction, thereby adjusting a cutting edge, that is, adjusting the position of the cutting insert 4.

Figure 2:
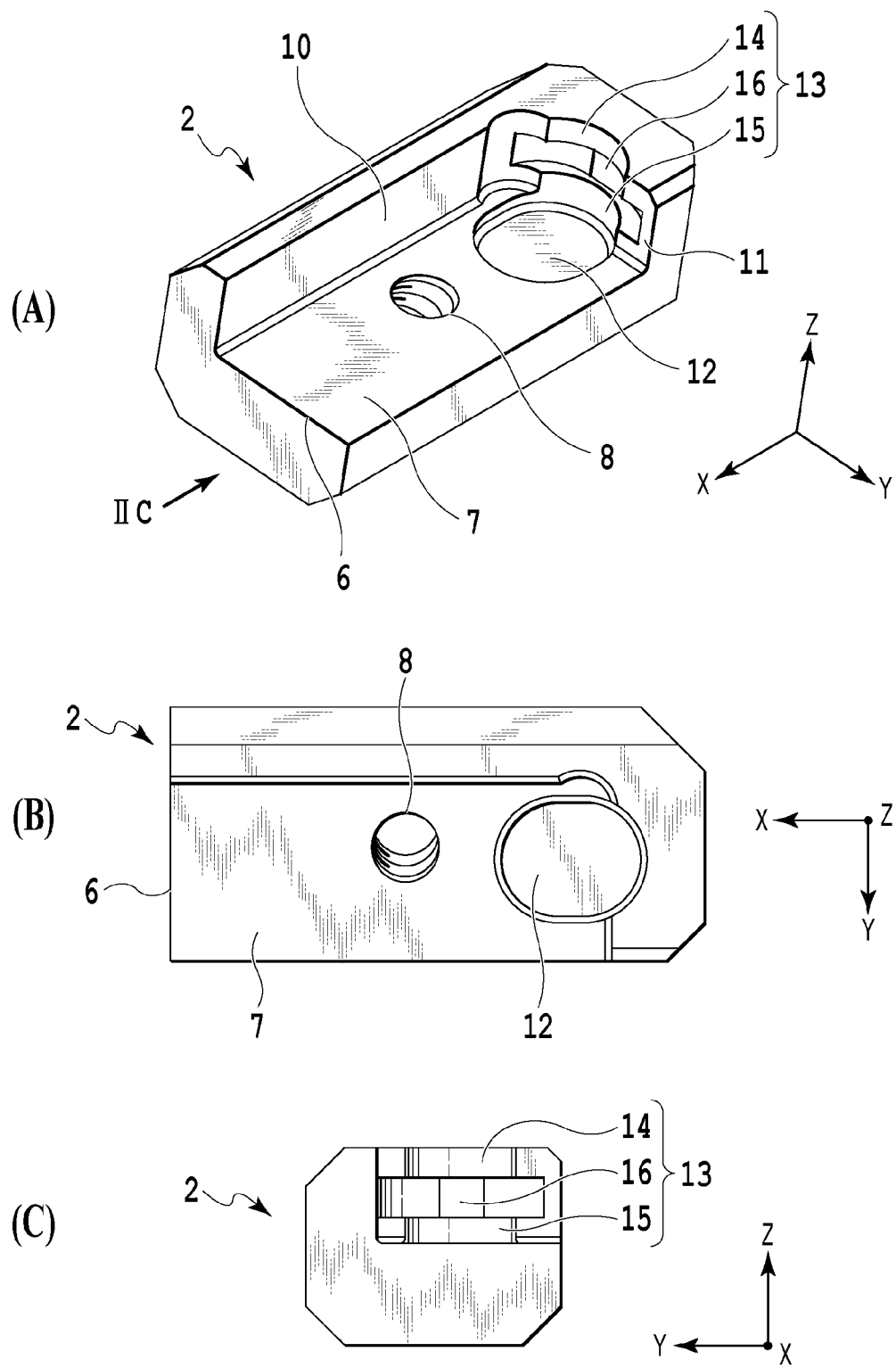
FIG. 2 shows a constitutional example of a tool body in the cutting edge adjustment device shown in FIG. 1, wherein (A) is a perspective view, (B) is a top view, and (C) is a side view, as viewed in a direction IIC of (A)

As shown in (A) to (C) of FIG. 2, the tool body 2 has a recess 6 so as to securely contain the cartridge 3 and the rotary member 5 therein. The recess 6 is formed from the distal end to the proximal end of the tool body 2 over a predetermined distance, and further, it is defined by a side surface 10 extending in parallel to an X-Z plane and another side surface 11 on the proximal end side extending in parallel to a Y-Z plane perpendicular to the X-Z plane. Hereinafter, a side surface extending in parallel to the X-Z plane inclusive of the side surface 10 of the recess 6 may be referred to as a longitudinal side surface whereas a side surface extending in parallel to the Y-Z plane perpendicular to the longitudinal side surface inclusive of the side surface 11 of the recess 6 may be referred to as a lateral side surface.

A bottom 7 of the recess 6 is a substantially flat plane extending in parallel to an X-Y plane, and has a screw hole 8 at almost the center thereof. The screw hole 8 is adapted to receive a fixing screw 9 for fixing the cartridge 3 to the tool body 2. The screw hole 8 is formed in a direction substantially perpendicular to the movement direction of the cartridge 3 parallel to the X axis (i.e., the positional adjustment direction of the cutting insert 4) with an inclination with respect to the bottom 7. In the present embodiment, the back of the screw hole is formed in such a manner as to be deflected toward the longitudinal side surface 10 of the recess 6. Furthermore, on the bottom 7 of the recess 6 is formed a rotary member holding hole 12 that is formed into a substantially elongated or elliptical shape adjacently to the lateral side surface 11 of the recess 6 and is adapted to allow rotation on a rotary center axis in a Z-axial direction of the rotary member 5 and movement in an X-axial direction while holding the rotary member 5. The longitudinal side surface 10 of the recess 6 is a substantially flat plane extending in parallel to the X-Z plane, and abuts against a longitudinal side surface of the cartridge 3.

At the lateral side surface 11 of the recess 6 is formed a rotary member containing portion 13 capable of holding the rotary member 5 therein. The rotary member containing portion 13 includes three concave curves 14, 15, and 16 arranged in the Z-axial direction. The first concave curve 14 is formed along the upper surface of the tool body 2 at substantially the center in the Y-axial direction of the lateral side surface 11. The second concave curve 15 is formed continuously with the side surface of the rotary member holding hole 12 formed on the bottom 7 at substantially the center in the Y-axial direction. The third concave curve 16 is formed between the first and second concave curves 14 and 15 in such a manner as to be more deeply concave than the first and second concave curves 14 and 15. The third concave curve 16 further includes three portions. Specifically, the belt-like third concave curve 16 includes two curved portions formed at both ends and one flat portion formed therebetween.

Figure 3:
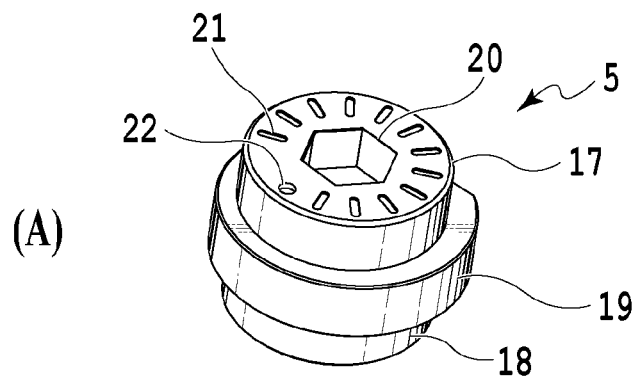
FIG. 3 shows a constitutional example of a rotary member in the cutting edge adjustment device shown in FIG. 1, wherein (A) is a perspective view, (B) is a top view, and (C) is a side view, as viewed in a direction IIIC (B)
Figure 3:
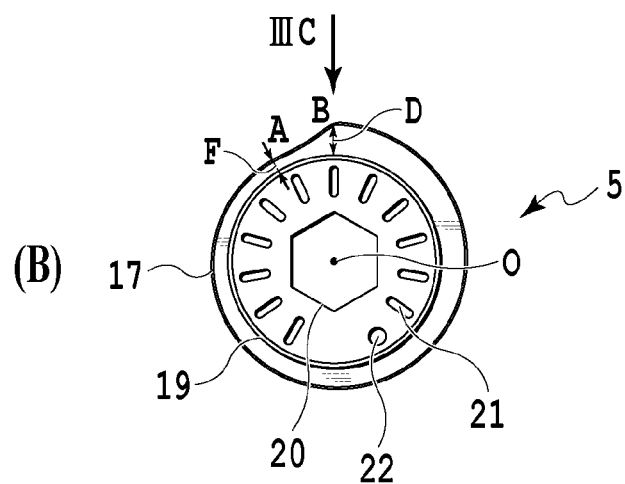
Figure 3:
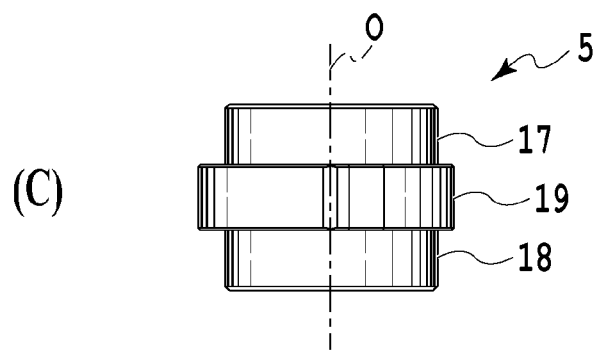

As shown in (A) to (C) of FIG. 3, the rotary member 5 is formed into a substantial cylinder including two end surfaces and an outer peripheral surface connecting the end surfaces to each other, and has a rotational center axis O. The rotary member 5 is such configured as to have two substantially cylindrical portions 17 and 18 having the same rotational center axis O and a third substantially cylindrical portion 19 decentered from the rotational center axis O (hereinafter also referred to as a cam portion) in arrangement in the direction of the rotational center axis O (i.e., the Z-axial direction). The first substantially cylindrical portion 17 is formed in a lateral cross section of a substantial circle and has one of the end surfaces of the rotary member 5. The second substantially cylindrical portion 18 is formed in a lateral cross section of a substantial circle and has the other end surface of the rotary member 5. In the present embodiment, the diameter of the laterally cross-sectional circle of the first substantially cylindrical portion 17 is substantially the same as that of the second substantially cylindrical portion 18. The cam portion 19 is sandwiched between the first substantially cylindrical portion 17 and the second substantially cylindrical portion 18. Specifically, in the present embodiment, the first substantially cylindrical portion 17 and the cam portion 19 are connected to each other, and further, the cam portion 19 and the second substantially cylindrical portion 18 are connected to each other.

As shown in (B) of FIG. 3, the cam portion 19 is formed in such a lateral cross section that a distance from the rotational center axis O to the outer peripheral surface (i.e., a radius) is gradually increased in a circumferential direction. Specifically, the radius from the rotational center axis O to the outer peripheral surface is gradually increased in a spiral fashion counterclockwise from a point A in (B) of FIG. 3 toward a point B in (B) of FIG. 3. As a consequence, the radius is minimum at the point A: in contrast, it is maximum at the point B after substantially cycling counterclockwise from the point A. The ratio of an increase in radius from the point A to the point B is kept constant. Therefore, the cam portion 19 is formed in such a manner as to have a cam face having a linearly increasing radius. Specifically, the following relationship is satisfied: $\Delta R = a \times \theta$, wherein $\theta°$ represents a rotational angle from the point A to the point B; $\Delta R$, a variation in radius of the cam portion 19; and a, an arbitrary proportional constant. Moreover, the radius at the point A (i.e., the minimum radius of the cam) is greater than that of the circular cross section of each of the first and second substantially cylindrical portions 17 and 18.

A fitting hole 20 is formed at the center of one of the end surfaces of the rotary member 5, that is, the end surface at which operation is allowable and visible, so as to receive a tool for rotating the rotary member 5 (e.g., a wrench or a driver). Furthermore, a plurality of, for example, linear marks 21 are engraved around the fitting hole 20. These marks 21 are formed at angular positions corresponding to the movement amount of a cutting edge, thereby constituting a scale. An operator refers to the scale and an indication mark, described later, and thus, can move the cutting edge by a required distance. The pitch (i.e., the interval) between the marks 21 forming the scale should be set to correspond to the movement amount of the cutting edge, for example, 0.01 mm or 0.1 mm. The shape of the cam portion 19, that is, the proportional constant 'a' is arbitrarily adjusted, so that the adjustable range of the position of the cutting edge can be selected.

As shown in (A) to (C) of FIG. 3, it is most desirable that the cam portion 19 should be formed such that the radius is linearly increased within the range of about one cycle of the rotary member 5, and further, that the plurality of marks 21 should be formed at equal intervals (i.e., at equal rotational angles) within the range of about one cycle of the upper circular end surface. However, the present invention is not limited to this. For example, the proportional constant 'a' may be stepwise changed from the point A to the point B. With this configuration, in a case where the interval between the marks 21 corresponds to the movement amount of the cutting edge in a one-to-one fashion, the intervals between the marks 21 may be constant in each of sections having the constant proportional constant 'a', while the intervals between the marks may be changed in a section having a different proportional constant 'a'. That is, the interval between the marks may be relatively small in a section having a large proportional constant: in contrast, the interval between the marks may be relatively large in a section having a small proportional constant. Moreover, the cam portion 19 may be configured such that the proportional constant 'a' is sequentially changed (e.g., gradually increased), and accordingly, that the intervals between the marks are varied (e.g., gradually decreased). These configurations also produce an advantage that the position of the cutting edge can be adjusted at a glance according to the scale.

In (A) to (C) of FIG. 3, other than the plurality of marks, a mark 22 is formed into not a line but a circle. The mark 22 functions as a set mark indicating an initial state of a cutting edge (specifically, the movement amount of the cartridge 3 or the cutting insert 4 is zero). In this embodiment, the mark 22 is formed at a position opposite to the point A by 180° with respect to the rotational center axis O. In other words, a rotational position when the set mark 22 is matched with an indication mark 41, described later, formed at the cartridge 3 is referred to as a reference position at which the movement amount of the cartridge 3 or the cutting insert 4 is zero. When the rotary member 5 is rotated clockwise from the reference position, the cartridge 3 as well as the cutting edge of the cutting insert 4 can be moved in the proximal end direction from the reference position.

Incidentally, although the cam portion 19 whose cam face has the radius that is linearly increased counterclockwise within almost one rotation of the rotary member 5 is used in the present embodiment, the present invention is not limited to this embodiment. For example, the radius of a cam may be increased clockwise or a range functioning as the cam face may be an appropriate range of less than one rotation of the rotary member 5.

Moreover, the shape of the rotary member 5 is not limited to the above-described one. For example, the rotary member 5 may include a cam portion, a substantially cylindrical portion, and a cam portion in this order or may include only one cam portion and only one substantially cylindrical portion. In other words, the rotary member 5 may be so configured as to include at least one substantially cylindrical portion having a constant radius and at least one cam portion having a radius that is gradually increased according to the rotational angle. As a matter of course, the configuration of the rotary tool holding surface 13 at the lateral side surface 11 of the tool body 2 may be appropriately modified according to the shape of the rotary member 5.

Furthermore, in the present embodiment, the rotary member 5 held in the above-described rotary member holding hole 12 formed into substantially the elongated or elliptical shape is not only rotated on the rotational center axis but also allowed to be shifted in the X direction according to the rotation in the radial enlargement direction. Instead of the above-described configuration, the rotary member 5 may be configured such that it is allowed to be only rotated on the rotational center axis while the substantially cylindrical portions 17 and 18 are appropriately decentered from the rotational center axis O so that points on the substantially cylindrical portions 17 and 18 at a great distance from the rotational center axis are gradually brought into contact with corresponding points on the rotary member holding portion 30.

Figure 4:
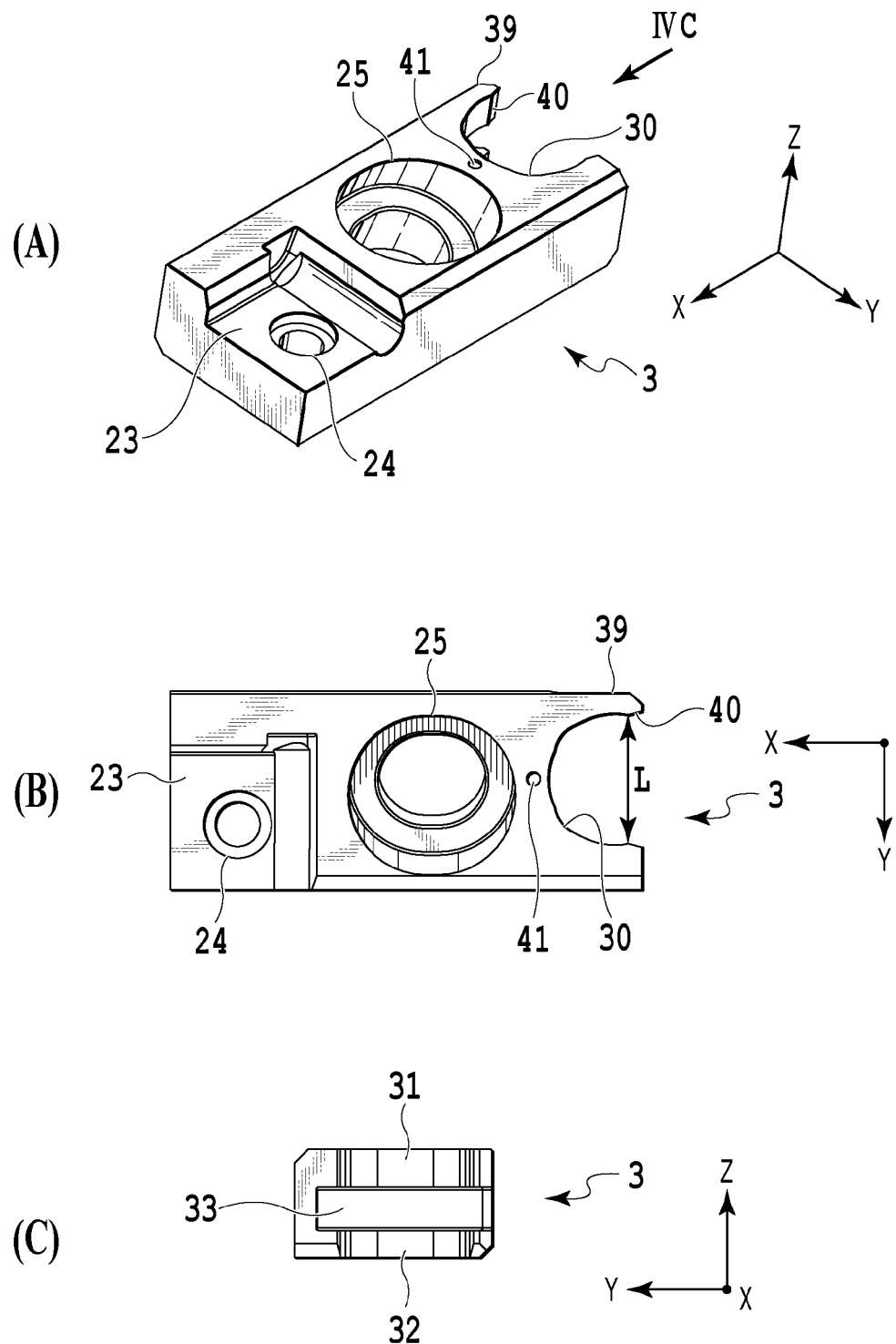
FIG. 4 shows a constitutional example of a cartridge in the cutting edge adjustment device shown in FIG. 1, wherein (A) is a perspective view, (B) is a top view, and (C) is a side view, as viewed in a direction IVC (A)

As shown in (A) to (C) of FIG. 4, the cartridge 3 is generally formed into a substantial rectangle including an upper surface, a lower surface, and side surfaces connecting the upper and lower surfaces. At the upper surface, an insert seat 23 is provided at a portion adjacent to one of the lateral side surfaces (i.e., the side surface at the distal end) of the substantial rectangular parallelepiped and the longitudinal side surface of the substantial rectangular parallelepiped, for mounting the cutting insert 4 thereon. More particularly, one of corners at the upper surface is cut out to form a recess functioning as the insert seat 23. At the bottom of the insert seat 23 is formed a screw hole 24 for fixing the cutting insert 4 to the cartridge 3. The shape of the insert seat 23 may be appropriately modified in conformity with the shape of the cutting insert 4 to be mounted. Furthermore, at substantially the center of the upper surface is formed a fixed hole 25, through which the cartridge 3 is fixed to the tool body 2 via the fixing screw 9. The fixed hole 25 has a small-diameter hole formed in a substantially elongated or elliptical shape elongated in the movement direction of the cartridge 3, as described later, (i.e., the positional adjustment direction of the cutting insert 4) (see (B) of FIG. 4).

Figure 6:
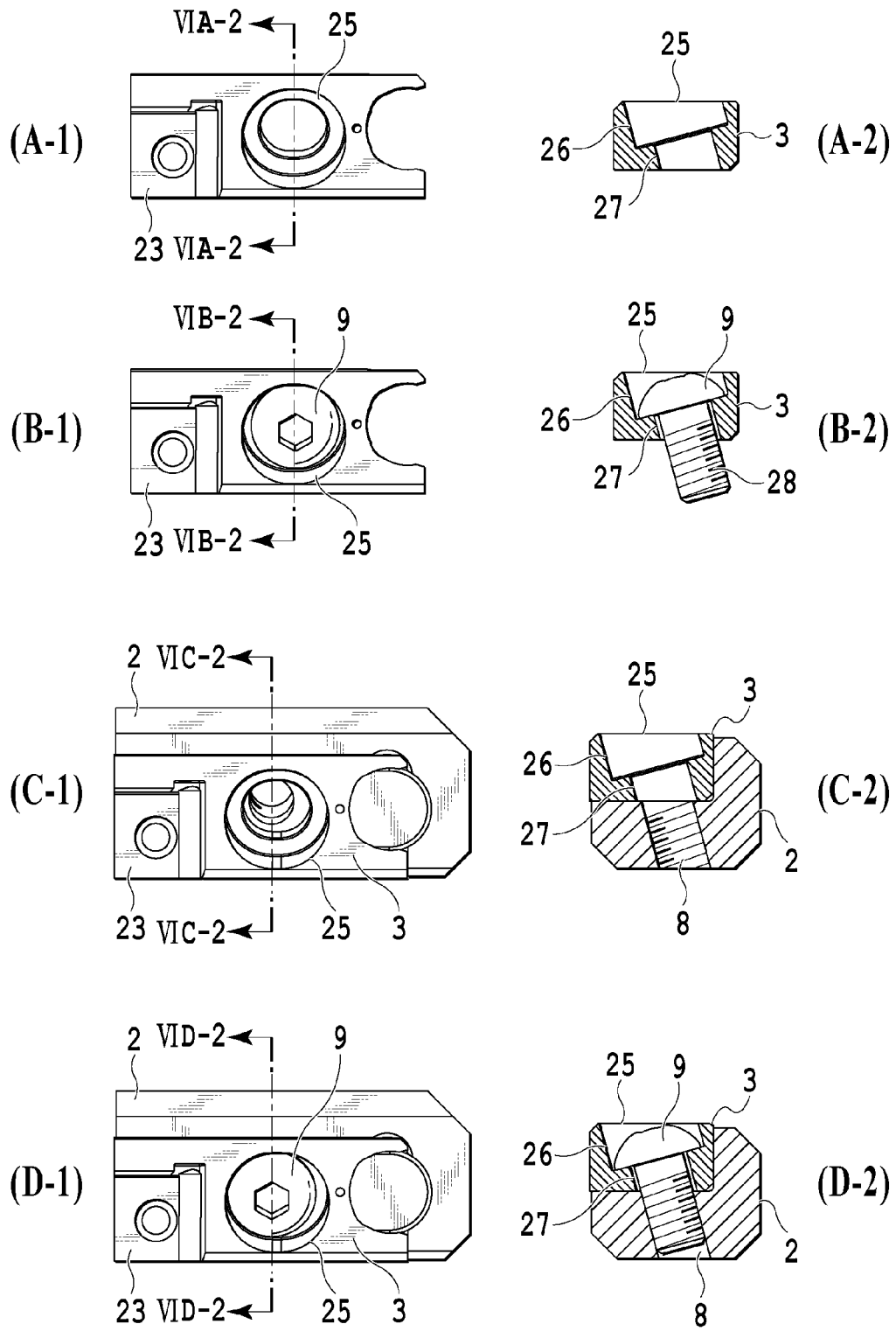
FIG. 6 illustrates assembly processes of the cutting edge adjustment device in the embodiment according to the present invention, wherein (A-1) and (A-2) are a plan view showing the cartridge and a cross-sectional view taken along a line VIA-2-VIA-2 near a fixed hole of the cartridge, respectively; (B-1) and (B-2) are a plan view showing the cartridge and a cross-sectional view taken along a line VIB-2-VIB-2 near the fixed hole of the cartridge when a fixing screw is inserted, respectively; (C-1) and (C-2) are a plan view showing the cartridge mounted on a tool body and a cross-sectional view taken along a line VIC-2-VIC-2 near the fixed hole of the cartridge, respectively; and (D-1) and (D-2) are a plan view showing the cartridge mounted on the tool body in the state of the insertion of the fixing screw and a cross-sectional view taken along a line VID-2-VID-2 near the fixed hole of the cartridge.

As shown best in (A-2) of FIG. 6, a step having a diameter reduced from the upper surface toward the lower surface is formed inside of the fixed hole 25. Specifically, the fixed hole 25 includes a relatively large diameter hole 26 and a relatively small diameter hole 27 that are continuous to each other via the step from the upper surface of the cartridge 3 toward the lower surface thereof. The large diameter hole 26 has a greater diameter than those of a shank 28 and a head 29 of the fixing screw 9. Furthermore, the small diameter hole 27 has a greater diameter than that of the shank 28 of the fixing screw 9 and a smaller diameter than that of the head 29. Consequently, the head 29 of the fixing screw 9 can be inserted into the large diameter hole 26 but cannot be inserted into the small diameter hole 27 so as to abut against the upper surface of the step. It is preferable that the depth of the large diameter hole 26 should be equal to or greater than the height of the head 29 of the fixing screw 9. Additionally, at least the small diameter hole 27 is formed into a substantially elongated or elliptical shape elongated in the movement direction of the cartridge 3 (i.e., the positional adjustment direction of the cutting insert 4). The fixed hole 25 is inclined in the same direction as that of the inclination of the screw hole 8 formed at the tool body 2. Specifically, in the present embodiment, the fixed hole 25 is inclined in the depth direction toward the longitudinal side surface opposite to the other longitudinal side surface cut out to form the insert seat 23. When the cartridge 3 is mounted on the tool body 2, the fixing hole 25 of the cartridge 3 is aligned with the screw hole 8 of the tool body 2 (see (C-2) and (D-2) of FIG. 6.)

As shown in (A) and (B) of FIG. 4, the rotary member holding portion 30 for holding the rotary member 5 is provided at the lateral side surface opposite to the other lateral side surface at which the insert seat 23 is formed. The rotary member holding portion 30 is curved inward of the cartridge (i.e., recessed in the X-axial direction), thereby forming a recess including three concave curves 31, 32, and 33 (see (C) of FIG. 4). More particularly, the rotary member holding portion 30 includes two concave curves having portions in abutment against the two substantially cylindrical portions 17 and 18 of the rotary member 5, respectively (i.e., the first concave curve 31 and the second concave curve 32) and one concave curve that is adjacent to the cam portion 19 of the rotary member 5 but does not abut thereagainst (i.e., the third concave curve 33).

Figure 5:
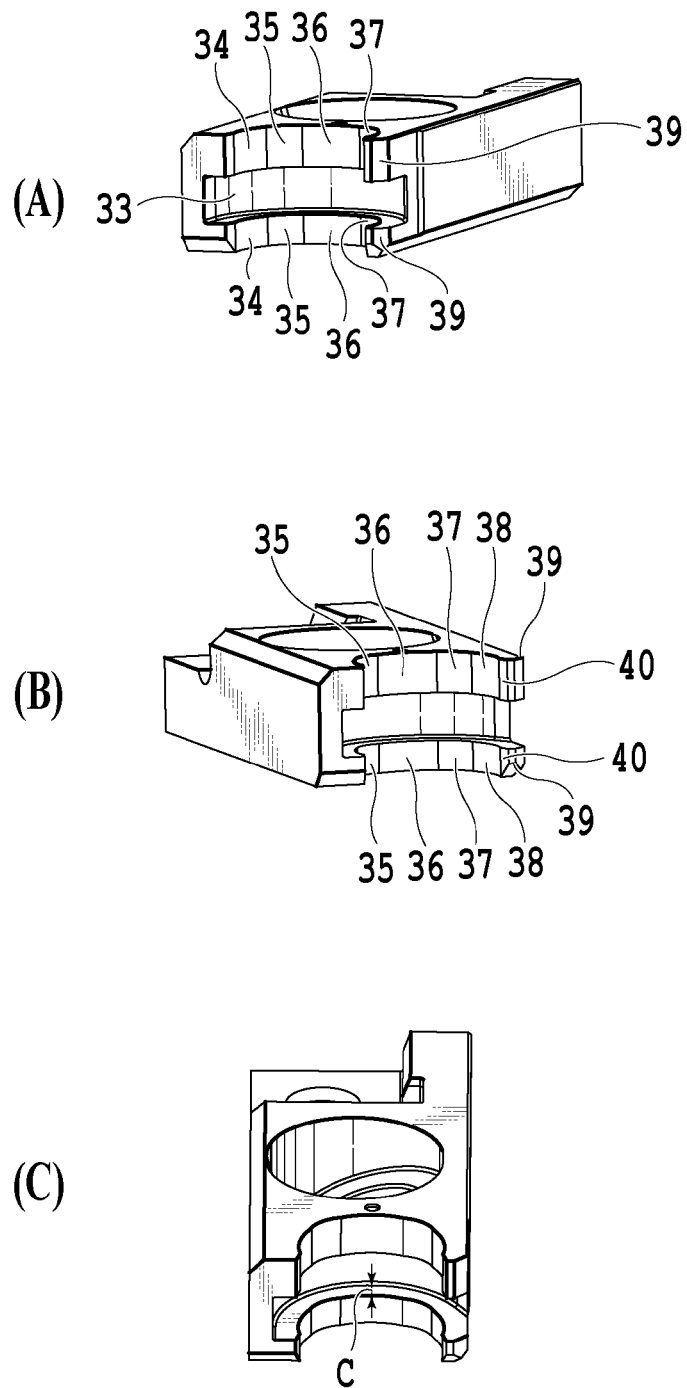
FIG. 5 shows a constitutional example of a rotary member holding portion of the cartridge shown in FIG. 4, wherein (A) to (C) are enlarged perspective views, as viewed in different directions.

The first concave curve 31 is formed contiguously to the upper surface of the cartridge 3, and includes mainly five portions, as shown in (A) and (B) of FIG. 5: a surface 34 in abutment against the rotary member 5, a flank 35 out of abutment against the rotary member 5, another surface 36 in abutment against the rotary member 5, another flank 37 out of abutment against the rotary member 5, and a further surface 38 in abutment against the rotary member 5, these being continuously formed in the order from the end of the belt-like curve. The flanks 35 and 37 out of abutment against the rotary member 5 are more recessed inward of the cartridge than the surfaces 34, 36, and 38 in abutment against the rotary member 5. Over the entire belt-like curve, the abutment surface 36 out of the three surfaces 34, 36, and 38 in abutment against the rotary member 5 is oriented in the movement direction of the cartridge 3 parallel to the X axis (i.e., the positional adjustment direction of the cutting insert 4) whereas the remaining two abutment surfaces 34 and 38 are oriented in the Y-axial direction substantially perpendicular to the movement direction of the cartridge 3 (i.e., the positional adjustment direction of the cutting insert 4). The second concave curve 32 is formed contiguously to the lower surface of the cartridge 3, and includes five surfaces 34 to 38, like the first concave curve 31.

The third concave curve 33 is formed between the first concave curve 31 and the second concave curve 32, and is more recessed inward of the cartridge than the first and second concave curves 31 and 32. The third concave curve 33 includes one curve that is generally continuous, thus defining a space adapted to contain the cam portion 19 of the rotary member 5. Here, minimum steps C formed between the first and second concave curves 31 and 32 and the third concave curve 33 (see (C) of FIG. 5) are greater than a difference D between the radii of the first and second substantially cylindrical portions 17 and 18 of the rotary member 5 and the radius of the cam portion 19 at the point B (i.e., the maximum radius of the cam) (see (B) of FIG. 3).

Furthermore, the first and second concave curves 31 and 32 are formed into a substantial C shape as the cartridge 3 is viewed on a plane, that is, in a direction parallel to the Z axis, as shown in (B) of FIG. 4. A length L between the two ends of the C shape is smaller than the diameter of each of the first and second substantially cylindrical portions 17 and 18 of the rotary member 5. Moreover, each of the first and second concave curves 31 and 32 is thinner at one end thereof than the other end in the Y-axial direction. The thinner end acts as an elastically deformable portion 39 that is elastically deformable outward with the application of force from the inside of the concave curve. A chamfer 40 may be applied to the inside of the end of the elastically deformable portion 39. The indication mark 41 formed into a circle, for example, is formed at the upper surface contiguous to the first concave curve 31. The indication mark 41 is a reference set mark indicating the movement amount of the cartridge 3 or the cutting insert 4, that is, the movement amount of the cutting edge. The rotary member 5 is rotated, and further, one of the marks 21 formed at the substantially cylindrical portion 17 is properly registered with the indication mark 41, so that the cutting edge can be moved by a desired distance.

The shape of the rotary member holding portion 30 of the above-described cartridge 3 may be appropriately varied in conformity with that of the rotary member 5. Even if a rotary member 5 includes, for example, a cam portion, a substantially cylindrical portion, and another cam portion arranged in this order, a rotary member holding portion 30 of a cartridge 3 can be formed into a shape in conformity with that of the rotary member 5.

Next, a description will be given below of the assembly of the cartridge 3 and the rotary member 5 with respect to the tool body 2.

As shown in (A-1) and (A-2) of FIG. 6, the cartridge 3 has the fixed hole 25 being formed from the upper surface toward the lower surface and including the large-diameter hole 26 having a relatively large diameter and the small-diameter hole 27 having a relatively small diameter that are connected to each other via the step. Therefore, in a case where the fixing screw 9 is inserted into the fixing hole 25, as shown in (B-1) of FIG. 6, the head 29 of the fixing screw 9 does not be inserted into the small-diameter hole 27 so as to abut against the upper surface of the step, as shown in (B-2) of FIG. 6. In the meantime, since the fixed hole 25 is inclined in the same direction as that of the screw hole 8 formed in the tool body 2, the fixed hole 25 of the cartridge 3 is aligned with the screw hole 8 of the tool body 2, as shown in (C-2) of FIG. 6, when the cartridge 3 is mounted on the tool body 2, as shown in (C-1) of FIG. 6.

Figure 7:
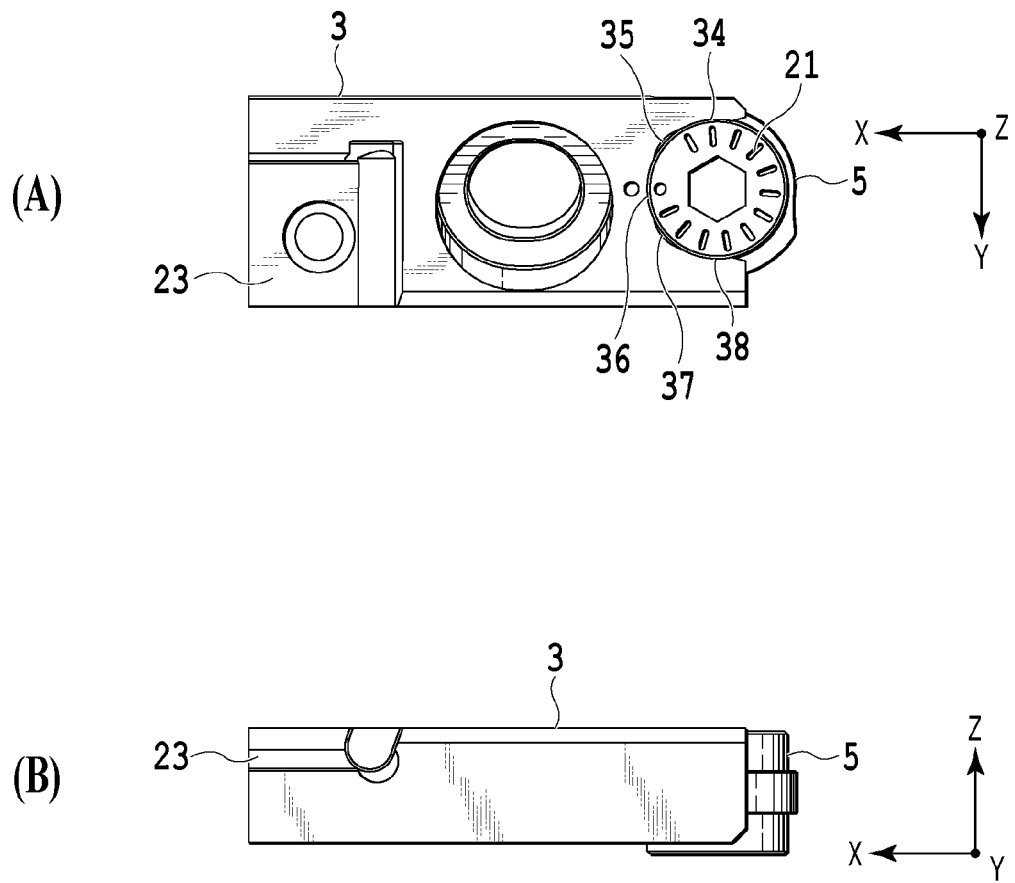
FIG. 7 shows the state in which the rotary member is assembled into the cartridge, wherein (A) is a plan view and (B) is a side view.

As shown in (A) and (B) of FIG. 7, the rotary member 5 is assembled with respect to the cartridge 3 and the tool body 2. At this time, the rotary member 5 is assembled such that the upper surface of the cartridge 3 is flush with the end surface having the scale formed thereat. As described above, the first and second concave curves 31 and 32 of the cartridge 3 are formed into the substantial C shape, in which the distance L between the two ends of the substantial C shape is shorter than the diameter of each of the first and second substantially cylindrical portions 17 and 18 of the rotary member 5. However, when the rotary member 5 is pushed into the open portion of the rotary member holding portion 30 formed into the substantial C shape in the X-axial direction, the elastically deformable portion 39 of each of the first and second concave curves 31 and 32 is elastically deformed to be enlarged outward of the cartridge 3. As a consequence, the elastically deformable portion 39 is enlarged to such an extent that the first and second substantially cylindrical portions 17 and 18 of the rotary member 5 can pass, so that the rotary member 5 can be inserted into the rotary member holding portion 30 of the cartridge 3. In this manner, the rotary member 5 is held in the rotary member holding portion 30 of the cartridge 3, and further, is securely supported by the elastically deformable portion 39.

In this state, the outer peripheral surfaces of the first and second substantially cylindrical portions 17 and 18 of the rotary member 5 are brought into contact only with the respective three abutment surfaces 34, 36, and 38 of the first and second concave curves 31 and 32 of the cartridge 3. The outer peripheral surface of the third substantially cylindrical portion (i.e., the cam portion) 19 of the rotary member 5 is adjacent to the third concave curve 33 of the cartridge 3 but is not brought into contact with the third concave curve 33 of the cartridge 3. Moreover, as described above, the minimum step C at the cartridge 3 is greater than the difference D at the rotary member 5, and therefore, the cam portion 19 having the gradually increased radius does not abut against the third concave curve 33 of the cartridge 3 even if the rotary member 5 is rotated. Thus, the rotary member 5 is not prevented from being rotated. In this manner, the rotary member 5 is held in the cartridge 3. Furthermore, the cutting insert 4 is mounted on the insert seat 23.

Figure 8:
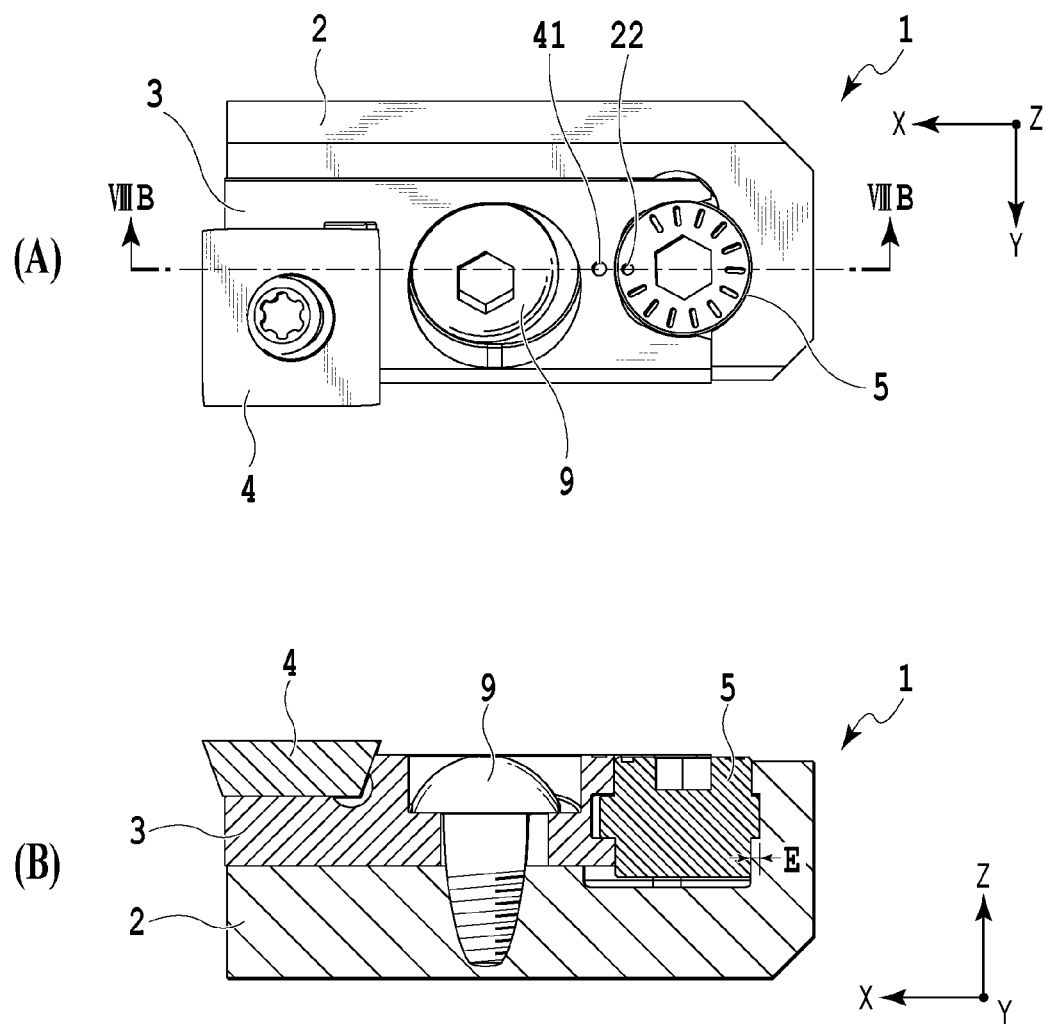
FIG. 8 shows the initial state of the cutting edge adjustment device according to the embodiment of the present invention (i.e., the movement amount of a cutting edge is zero), wherein (A) is a plan view and (B) is a cross-sectional view taken along a line VIIIB-VIIIB of (A)

As shown in (A) and (B) of FIG. 8, the cartridge 3 holding the rotary member 5 therein in the above-described manner is mounted on the tool body 2 such that its upper surface is flush with the upper surface of the tool body 2. At this time, the cartridge 3 is mounted such that the outer peripheral surface of the rotary member 5 held in the cartridge 3 is brought into contact with the rotary member containing portion 13 of the tool body 2. The outer peripheral surfaces of the first and second substantially cylindrical portions 17 and 18 of the rotary member 5 abut against the first and second concave curves 14 and 15 of the tool body 2, respectively. The outer peripheral surface of the third substantially cylindrical portion (i.e., the cam portion) 19 of the rotary member 5 abuts against the third concave curve 16 of the tool body 2.

In the tool body 2, a step E (see (B) of FIG. 8) between the flat surface (i.e., a cam receiving surface) of the third concave curve 16 and each of the first and second concave curves 14 and 15 has a length substantially equivalent to a difference F (see (B) of FIG. 3) between the radius of each of the first and second substantially cylindrical portions 17 and 18 of the rotary member 5 and the radius of the cam portion 19 at the point A (i.e., the minimum radius of the cam). Consequently, when the third substantially cylindrical portion 19 having the minimum radius at the point A of the rotary member 5 abuts against the flat surface of the third concave curve 16 of the tool body 2, the rotary member 5 and the cartridge 3 are assembled with respect to the tool body 2 with few gaps: at this time, the cutting edge adjustment device 1 is in an initial state in which the movement amount of a cutting edge is zero (i.e., the movement amount of the cutting insert 4 is zero), as shown in (A) and (B) of FIG. 8. The fixing screw 9 is screwed to the screw hole 8, so that the cartridge 3 is fixed to the tool body 2, as shown in (D-1) and (D-2) of FIG. 6. At this time, the indication mark 41 as the set mark on the cartridge 3 matches with the set mark 22 on the rotary member 5. In this manner, the cartridge 3 and the rotary member 5 are mounted on the tool body 2, thus completing the assembly of the cutting edge adjustment device 1 in the present embodiment.

Even if the rotary member 5 is not such configured as the embodiment shown in (A) to (C) of FIG. 3, for example, even if the rotary member 5 includes a cam portion, a substantially cylindrical portion, and another cam portion arranged in this order, the portions for holding the rotary member 5 in the tool body 2 and the cartridge 3 can be formed into shapes in conformity with that of the rotary member 5, as described above, and therefore, the cartridge 3 and the rotary member 5 can be basically mounted on the tool body 2 in the same manner as described above.

Subsequently, explanation will be made on modes, operations, and advantageous results of cutting edge adjustment in the cutting edge adjustment device 1 of the present embodiment.

The set mark 22 and the indication mark 41 match with each other in the initial state. In this state, the cam portion abuts against the flat surface of the third concave curve 16 of the tool body 2 at the point A at which the cam has the minimum radius, so that the cartridge 3 and the cutting insert 4 are most eccentrically located at the proximal end (i.e., the most retreated position of the cutting edge). When the cutting edge adjustment device 1 in the present embodiment adjusts the cutting edge, a wrench or the like is fitted into the fitting hole 20, so that the rotary member 5 is rotated in a direction in which the radius of the third substantially cylindrical portion 19 of the rotary member 5 (i.e., the radius of the cam) is increased. As shown in (A) and (B) of FIG. 8, since the side surface of the cartridge 3, for holding the rotary member 5, and the tool body 2 are brought into contact with each other with few gaps before the rotation, it is possible to readily understand the rotational direction in which the radius is increased with reference to the array of the marks 21 formed at the end of the rotary member 5. However, an indication such as an arrow may be formed in order to indicate the rotational direction in which the radius is increased. An indication (e.g., "+") of a direction in which the radius is increased may be additionally formed with an arrow indicating the rotational direction.

Figure 9:
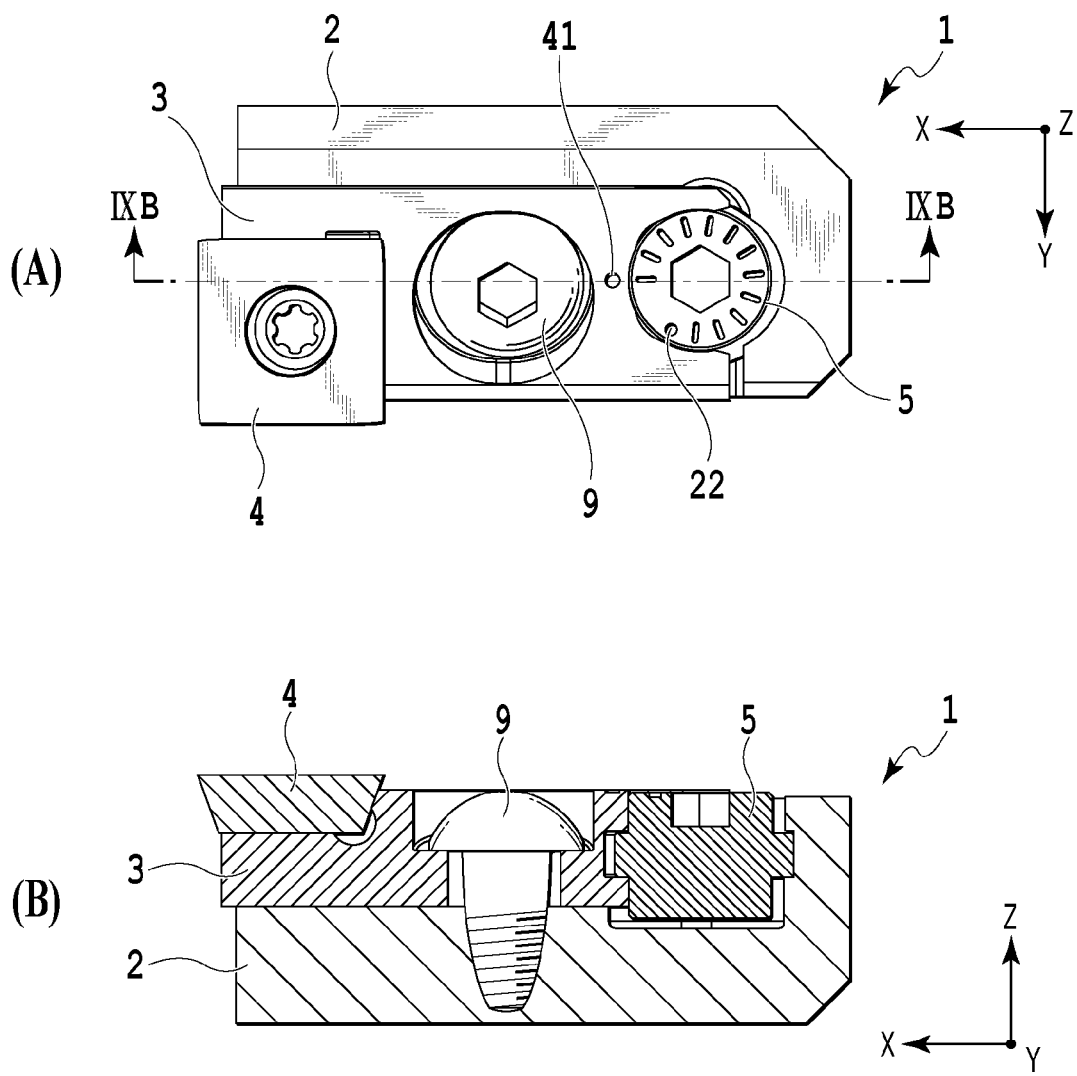
FIG. 9 shows the cutting edge adjustment device in a state in which a cutting edge is moved from the state shown in FIG. 8, wherein Fig. (A) is a plan view and (B) is a cross-sectional view taken along a line IXB-IXB of (A)

When the rotary member 5 is rotated from the initial position in the direction in which the radius of the cam portion 19 is increased, gaps are produced between the outer peripheral surfaces of the first and second substantially cylindrical portions 17 and 18 of the rotary member 5 and the first and second concave curves 14 and 15 of the tool body 2 as the radius is increased, that is, a portion of the cam face having a greater radius abuts against the flat surface of the third concave curve 16 of the tool body 2. The gaps become larger according to the further rotation. In other words, the rotary member 5 is rotated in the direction in which the radius is increased, so that the cartridge 3 is moved toward the distal end (i.e., in the X-axial direction) (see (A) and (B) of FIG. 9).

Even if the fixing screw 9 which fixes the cartridge 3 to the tool body 2 is not descrewed from the fixed hole 25, the small-diameter hole 27 of the fixed hole 25 formed into the substantially elongated or elliptical shape elongated in the movement direction allows the movement of the cartridge 3. Specifically, the fixing screw 9 may be fastened to the screw hole 8 enough to temporarily fix the cartridge 3 or may be fully fastened. When a pressing force produced by the rotation of the rotary member 5 is sufficiently greater than the maximum value of a cartridge restraint force produced by fastening the fixing screw 9, the cartridge 3 can be moved even in the fastened state of the fixing screw 9. The fixed hole 25 formed at the cartridge 3 is formed into a shape elongated in the movement direction of the cartridge 3 (i.e., the positional adjustment direction of the cutting insert 4), and therefore, a play is previously provided at the fixed hole 25 in the cutting edge adjustment direction. As a consequence, even in the state in which the fixing screw 9 is fastened, the cartridge 3 can be moved by the amount of the play. The rotation of the rotary member 5 in this manner can achieve the movement of the cartridge 3, and thus, can implement the adjustment of the cutting edge at a desired position. In a case where the fixing screw 9 is temporarily fixed, it is fully fastened after the adjustment.

As shown in (B) of FIG. 3 being a plan view, the cam portion 19 of the rotary member 5 is formed into such a shape that the radius is linearly increased counterclockwise over the substantially entire circumference from the point A to the point B. In the present embodiment, the unit rotational angle amount of the rotary member 5 and the unit increase amount of the radius are set proportionally to each other. As a consequence, since the unit rotational angle amount of the rotary member 5 and the unit movement amount of the cartridge 3 also are proportional to each other, an operator can very readily adjust the movement amount of the cutting edge, unlike in the typical cam type cutting edge adjustment device as disclosed in Patent Literature 1. Moreover, since the rotational amount of the rotary member 5 and the movement amount of the cutting edge are continuously proportional to each other, the position of the cutting edge can be adjusted with high accuracy. At this time, with, for example, an L-shaped wrench, the orientation of the wrench arm unfitted to the fitting hole 20 can show the rotational amount of the rotary member 5 and the movement amount of the cutting edge. However, the scale including the plurality of marks 21 and the set mark 22 is additionally provided at the end of the rotary member 5, like in the present embodiment, thus more facilitating the adjustment of the movement amount of the cutting edge. In other words, the position of the cutting edge can be accurately and rapidly adjusted without using a measuring instrument such as a dial indicator together. Furthermore, the set mark 22 formed for indicating that the movement amount of the cutting edge is zero is matched with the indication mark 41, thus more facilitating the control of the movement amount of the cutting edge.

Incidentally, the shapes and forms of the marks 21, the set mark 22, and the indication mark 41 are not limited to those shown in (B) of FIG. 3 and the like, and therefore, they may be appropriately varied. For example, the marks may be formed into triangles or rectangles. Alternatively, the marks may be formed into shapes of significant characters, symbols, or numbers such as "S" representing the set mark or "O" representing an origin. Furthermore, these marks or the scale may not be engraved, unlike described above. For example, they may be printed or stuck with a print piece, or may be formed into a relief pattern. In addition, an indication mark is formed at the end of the substantially cylindrical portion 17 of the rotary member 5 whereas a plurality of marks may be appropriately formed at the upper surface of the cartridge 3 and/or the tool body 2 contiguous to the end, thus forming a scale.

As described above, the rotary member 5 can be securely held between both ends of each of the first and second concave curves 31 and 32 by the elastic force of the elastically deformable portions 39 of the cartridge 3. Therefore, the cartridge 3 and the rotary member 5 integrally have high rigidity. Even after the rotation of the rotary member 5 adjusts the cutting edge, it is possible to suppress any shift of the rotary member 5. Particularly in cutting, the rotary member 5 receives a large force caused by cutting resistance or a centrifugal force produced by the rotation of a workpiece to be cut or the tool body. In view of this, an improvement in mounting rigidity in this manner is a big advantage. Moreover, a screw or the like for fixing the rotary member 5 to the cartridge 3 or the tool body 2 is not needed, thus reducing the number of required components. Furthermore, there is no possibility of the detachment of the rotary member 5 when the cartridge 3 is detached from the tool body 2, thus preventing any loss of the rotary member 5. Additionally, the chamfer 40 is applied to the end of the elastically deformable portion 39, thus smoothly guiding the rotary member 5 so as to prevent any breakage of the elastically deformable portion 39. However, although an advantage produced by utilizing the elastic deformation in this manner cannot be achieved, the rotary member 5 may be configured in such a manner as to be fixed by fixing unit such as a screw according to the present invention.

Moreover, in the first and second concave curves 31 and 32 of the cartridge 3, the portions abutting against the rotary member 5 are restricted to the abutment surface 36 oriented in the movement direction of the cartridge 3 in parallel to the X axis (i.e., the positional adjustment direction of the cutting insert 4) and the abutment surfaces 34 and 38 oriented in the Y-axial direction substantially perpendicular to the movement direction of the cartridge 3: in contrast, the other portions act as the flanks 35 and 37 (see (A) of FIG. 7). Therefore, even if the first or second substantially cylindrical portion 17 or 18 is somewhat deformed because of manufacturing tolerances, the abutment can be stably kept all the time. Consequently, it is possible to suppress any play of the rotary member 5 caused by the deformation because of the manufacturing tolerances of the rotary member 5, so that the cutting edge is accurately adjusted. Furthermore, a greatest force is applied to the first and second concave curves 31 and 32 of the cartridge 3 in the movement direction of the cartridge 3 (i.e., the positional adjustment direction of the cutting insert 4) during the cutting or the adjustment of the cutting edge. As a result, the abutment surfaces are formed such that they are oriented in the movement direction of the cartridge 3 and the direction substantially perpendicular to the movement direction of the cartridge 3, so that they can securely receive the force produced by the cutting resistance or the adjustment of the cutting edge, so as to prevent any shift in a lateral direction. Thus, the rotary member 5 can be stably supported, and at the same time, the rotary member 5 or the cartridge 3 can be effectively prevented from being broken.

Additionally, the axis in the depth direction of the hole integrally including the fixed hole 25 of the cartridge 3, into which the fixing screw 9 is inserted, and the screw hole 8 of the tool body 2 is substantially perpendicular to the movement direction of the cutting insert 4 (i.e., the X-axial direction), and further, its back is inclined toward the inside surface defining the recess 6 of the tool body 2, that is, in a direction oriented to the longitudinal side surface 10 (i.e., in a direction in which it is inclined with respect to the upper surface of the cartridge 3). As a consequence, when the fixing screw 9 is fastened, force is applied to the cartridge 3 to be pressed against the inside surface of the tool body 2. Thus, no gap is produced between the longitudinal side surface of the cartridge 3 and the inside surface of the tool body 2, and therefore, it is possible to adjust the cutting edge with high accuracy, and further, to prevent the chip discharging ability from being degraded, without any gap which possibly catches chips. In addition, the fixed hole 25 of the cartridge 3 is formed into the shape obtained by connecting the large-diameter hole 26 to the small-diameter hole 27 via the step, thus making it possible to completely contain the head 29 of the fixing screw 9 below the surface of the cartridge 3. Therefore, chips produced by cutting cannot be inhibited by the head 29 of the fixing screw 9, thus achieving an excellent chip discharging ability.

As described above, the cutting edge adjustment device 1 in the present embodiment basically has the very simple configuration including the tool body 2, the cartridge 3, the cutting insert 4, the rotary member 5, and the fixing screw 9, and therefore, the number of required component parts can be remarkably reduced in comparison with the typical construction. Consequently, the cutting edge adjustment device 1 capable of readily and rapidly adjusting the cutting edge with high accuracy can be fabricated at a reduced cost.

The present invention is not limited to the above-described embodiment and the modifications relevant to the embodiment that have been explained at the appropriate parts, and therefore, it may be substituted and varied without departing from the spirit and scope of the present invention defined by claims of the present application.

For example, the movement direction of the cutting edge may be arbitrarily varied by varying the mounting position or direction of the rotary member 5. Specifically, the present invention provides an adjustment device that is applicable according to all movement directions in a case where the movement of the cutting edge is needed or should be varied. The number of rotary members 5 used according to the present invention is not limited to one as described above. Specifically, a plurality of rotary members 5 may be combined, thus achieving a more complicated positional adjustment. Furthermore, the adjustment device according to the present invention is applicable to all kinds of cutting tools such as a turning tool, a milling tool, and a drilling tool. The shapes and mounting positions of the cartridge 3 and rotary member 5 may be appropriately varied according to the shape of the tool or tool body or the purpose of the adjustment.

Figure 10:
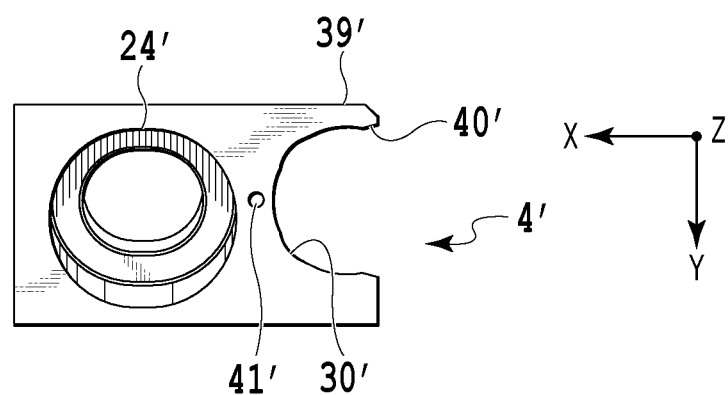
FIG. 10 is a plan view schematically showing a constitutional example of a cutting insert that is applied to another embodiment according to the present invention.

Without the above-described cartridge 3, the rotary member 5 may directly press the cutting insert 4. In this case, a cutting insert 4' is configured such that a rotary member holding portion 30' similar to the above-described rotary member holding portion 30 is formed at a lateral surface, and concave curves for receiving the rotary member 5 are provided at the rotary member holding portion 30', as shown in FIG. 10, thus enhancing the fixability of the rotary member 5. It is preferable to form an elastically deformable portion 39' and a chamfer 40' inside of the end of the elastically deformable portion 39'. A fixed hole 24' to be used in fixing the cutting insert 4' to the tool body may be formed in the same manner as the above-described fixed hole 25 of the cartridge 3. At this time, in consideration of the size or cutting performance of the cutting insert 4, a configuration similar to that at the above-described cartridge 3 may be applied to the cutting insert 4. Instead of the cartridge 3 that is adapted to hold the cutting insert 4 and is mounted on the tool body 2, at least another pressing member serving as a displacement transmitting member may be interposed between the cutting insert 4 and the rotary member 5, and thus, the rotary member 5 may press the cutting insert 4 via the pressing member. Also at this time, in consideration of the size of the pressing member or the cutting performance, a configuration similar to that at the above-described cartridge 3 may be applied to the pressing member. Incidentally, although the pressing member does not perform the connection by holding the cutting insert 4, as described above, it is to be understood that the pressing member can serve as the cartridge to be connected to the cutting insert 4 as the displacement transmitting mechanism in a state mounted on the tool body 2.

While the substantial C shaped rotary member holding portion 30 formed at the cartridge 3 is formed at the tool body 2, the rotary member containing portion 13 formed at the tool body 2 may be formed at the cartridge 3. Specifically, the configuration and function of holding the rotary member 5 by the cartridge 3 and the tool body 2 may be changed from those in the above-described embodiment. In this case, the above-described various advantageous results can be produced in the same manner.

Alternatively, there may be provided a mechanism in which an urging member such as a spring consistently presses the cartridge 3 against the rotary member 5 by a constant force. In this case, even if the fixing screw 9 is loosened in order to adjust the position of the cutting edge, the cartridge 3 is brought into close contact with the rotary member 5 all the time, thus preventing the cartridge 3 from being shifted toward the cutting insert 4 by the influence of gravity or the like, so as to more readily adjust the position of the cutting edge. There may be provided a mechanism for pressing the rotary member 5 against the flat surface of the third concave curve 16 of the tool body 2. This allows to move the cartridge 3 or the cutting insert 4 not only in a direction toward the distal end but also toward the proximal end. In this manner, in a case where, for example, the rotary member 5 is excessively rotated, so that the cartridge 3 or the cutting insert 4 is moved more than required, the appropriate return of the rotational position of the rotary member 5 can achieve the adjustment of the cutting edge at an optimum position.

The invention claimed is:

1. A cutting edge adjustment device for a cutting tool for adjusting the position of a cutting edge of a cutting insert by causing movement of the cutting insert, the cutting edge adjustment device comprising:
   at least one rotary member for producing the movement;
   wherein the rotary member is formed into a shape in which at least one substantially cylindrical portion having an outer peripheral surface whose radius is constant and at least one cam portion having a cam face whose radius is gradually increased in a manner corresponding to the amount of the movement are arranged in a direction of a rotational center axis,
   wherein the cutting insert is directly or indirectly pressed against the rotary member by the action of the cam face according to the rotation of the rotary member on the rotational center axis, so as to adjust the position of the cutting edge;
   wherein the cutting insert is fixed to a cartridge having a portion adapted to abut against either one of the substantially cylindrical portion and the cam portion,
   the cartridge is mounted on a tool body having a portion adapted to abut against the other one of the substantially cylindrical portion and the cam portion, and
   a position at which the cam face of the cam portion abuts against the portion adapted to abut against the cam is varied according to the rotation of the rotary member, so that the rotary member presses the cartridge so as to adjust the position of the cutting edge.

2. The cutting edge adjustment device according to claim 1, wherein the cartridge has concave curves abutting against the substantially cylindrical portion of the rotary member.

3. The cutting edge adjustment device according to claim 2, wherein the cartridge has at least one concave curve abutting against the substantially cylindrical portion of the rotary member and at least one concave curve that is adjacent to but does not abut against the cam portion.

4. The cutting edge adjustment device according to claim 3, wherein each of the concave curves abutting against the substantially cylindrical portion of the rotary member is formed into a substantial C shape having ends on the side of the rotary member, as viewed in a direction parallel to the rotational center axis,
   a distance between the ends of the substantial C shape is smaller than the diameter of the substantially cylindrical portion of the rotary member, and
   at least one end of the substantial C shape is formed as an elastically deformable portion that can be elastically deformed.

5. The cutting edge adjustment device according to claim 3, wherein the rotary member includes first and second substantially cylindrical portions, each having a constant radius, and the cam portion; the first substantially cylindrical portion, the cam portion, and the second substantially cylindrical portion being connected to each other in this order in the direction of the rotational center axis, and
   the cartridge includes a first concave curve formed in such a manner as to abut against the outer peripheral surface of the first substantially cylindrical portion, a second concave curve formed in such a manner as to abut against the outer peripheral surface of the second substantially cylindrical portion, and a third concave curve in such a manner as to be recessed more deeply than the first and second concave curves so as to be adjacent to but not to abut against the cam face of the cam portion.

6. The cutting edge adjustment device according to claim 5, wherein the first and second concave curves of the cartridge each only partly abuts against the outer peripheral surfaces of the first and second substantially cylindrical portions of the rotary member.

7. The cutting edge adjustment device according to claim 6, wherein portions at each of the first and second concave curves of the cartridge, which abut against the outer peripheral surfaces of the first and second substantially cylindrical portions of the rotary member, are an abutment surface formed in such a manner as to be oriented in the movement direction of the cutting insert and abutment surfaces formed in such a manner as to be oriented in a direction substantially perpendicular to the movement direction of the cutting insert.

8. The cutting edge adjustment device according to claim 1, wherein a fixed hole in the form of a through hole, into which a fixing screw is inserted in order to fix the cartridge to the tool body, is formed at the cartridge,
   the fixed hole being formed into a substantially elongated or elliptical shape relatively elongated in the movement direction of the cutting insert.

9. The cutting edge adjustment device according to claim 8, wherein the fixed hole includes a large-diameter hole having a relatively large diameter and a small-diameter hole having a relatively small diameter, these holes being connected to each other via a step in a depth direction,
   the diameter of the large-diameter hole being greater than that of a head of the fixing screw, the diameter of the small-diameter hole being smaller than that of the head of the fixing screw and greater than that of a shank of the fixing screw, and further, the depth of the large-diameter hole being greater than the height of the head of the fixing screw.

10. The cutting edge adjustment device according to claim 8, wherein the axis of the fixed hole of the cartridge in the depth direction is substantially perpendicular to the movement direction of the cutting insert and is inclined with respect to the upper surface of the cartridge, to which the fixed hole is opened.

11. The cutting edge adjustment device according to claim 1, wherein the cutting insert has a portion that abuts against the rotary member so as to be pressed directly by the rotary member.

12. A cutting edge adjustment device for a cutting tool for adjusting the position of a cutting edge of a cutting insert by causing movement of the cutting insert, the cutting edge adjustment device comprising:
   at least one rotary member for producing the movement;
   wherein the rotary member is formed into a shape in which at least one substantially cylindrical portion having an outer peripheral surface whose radius is constant and at least one cam portion having a cam face whose radius is gradually increased in a manner corresponding to the amount of the movement are arranged in a direction of a rotational center axis,
   wherein the cutting insert is directly or indirectly pressed against the rotary member by the action of the cam face according to the rotation of the rotary member on the rotational center axis, so as to adjust the position of the cutting edge;
wherein at least one pressing member is interposed between the rotary member and the cutting insert,
the cutting insert being pressed by the rotary member via the pressing member, and
the pressing member having the portion that abuts against the rotary member.

13. The cutting edge adjustment device according to claim 11, wherein the portion that abuts against the rotary member includes at least one concave curve that abuts against the substantially cylindrical portion of the rotary member and at least one concave curve that is adjacent to but does not abut against the cam portion.

14. The cutting edge adjustment device according to claim 13, wherein the concave curve that abuts against the substantially cylindrical portion of the rotary member is formed into a substantial C shape having ends on the side of the rotary member, as viewed in a direction parallel to the rotational center axis,
a distance between the ends of the substantial C shape being smaller than the diameter of the substantially cylindrical portion of the rotary member, and
at least one end of the substantial C shape being an elastically deformable portion that can be elastically deformed.

15. The cutting edge adjustment device according to claim 11, further comprising a scale for displaying the rotational amount of the rotary member and an indication mark for pointing out the scale,
the rotary member having a visible end, at which the scale or the indication mark is formed.

16. A cutting edge adjustment device comprising, in combination;
a rotary member having a rotational center axis (O) and comprising a substantially cylindrical portion and a cam portion having a cam face whose radius gradually increases in a circumferential direction, the substantially cylindrical portion and the cam portion being arranged along the rotational center axis (O); and
a cartridge having an insert seat formed at a first end, a rotary member holding portion formed at a second end, and a fixing hole located between the first and second ends; wherein:
at the second end, the cartridge's rotary member holding portion comprises a concave abutment surface and a concave curved surface, the concave curved surface being recessed inward of the cartridge relative to the concave abutment surface;
the cartridge's rotary member holding portion is configured to receive the rotary member, with the cam face of the rotary member opposing the concave curved surface, and the substantially cylindrical portion of the rotary member opposing the concave abutment surface of the cartridge's rotary member holding portion.

17. The cutting edge adjustment device according to claim 16, wherein:
the rotary member comprises first and second substantially cylindrical portions spaced apart along the rotational center axis (O) by the cam portion;
the second end of the cartridge's rotary member holding portion comprises concave first and second abutment surfaces spaced apart by the concave curved surface; and
the cartridge's rotary member holding portion is configured to receive the rotary member, with the cam face of the rotary member opposing the concave curved surface, and the first and second substantially cylindrical portions of the rotary member opposing the first and second concave abutment surfaces of the cartridge's rotary member holding portion.

18. A tool body in combination with the cutting edge adjustment device of claim 16, wherein:
the tool body comprises a recess having a recess bottom and a recess side surface comprising a rotary member containing portion, the recess bottom having a screw hole and a rotary member receiving hole formed therein, the rotary member receiving hole being adjacent the rotary member containing portion;
the cutting edge adjustment device is seated in the recess of the tool body and secured to the recess bottom by a fixing screw passing through the cartridge's fixing hole and into the screw hole;
the rotary member is positioned between the rotary member containing portion of the recess side surface and the cartridge's rotary member holding portion;
one of the rotary member's substantially cylindrical portion and the cam portion is seated in the rotary member holding hole formed in the tool body's recess;
the substantially cylindrical portion of the rotary member is in abutment with the concave abutment surface of the cartridge's rotary member holding portion;
the cam face of the rotary member is in abutment with a surface of the tool body's rotary member containing portion; and
the cam face of the rotary member is spaced apart from the concave curved surface of the cartridge's rotary member holding portion.

19. The cutting edge adjustment device according to claim 1, wherein the radius of the cam face is linearly increased over the substantially entire circumference.

20. The cutting edge adjustment device according to claim 1, wherein a unit rotational angle of the rotary member is proportional to a unit movement amount of the cutting insert.

* * * * *